May 5, 1931. C. H. ROTH 1,804,061
CAMERA
Filed Feb. 9, 1929 6 Sheets-Sheet 1
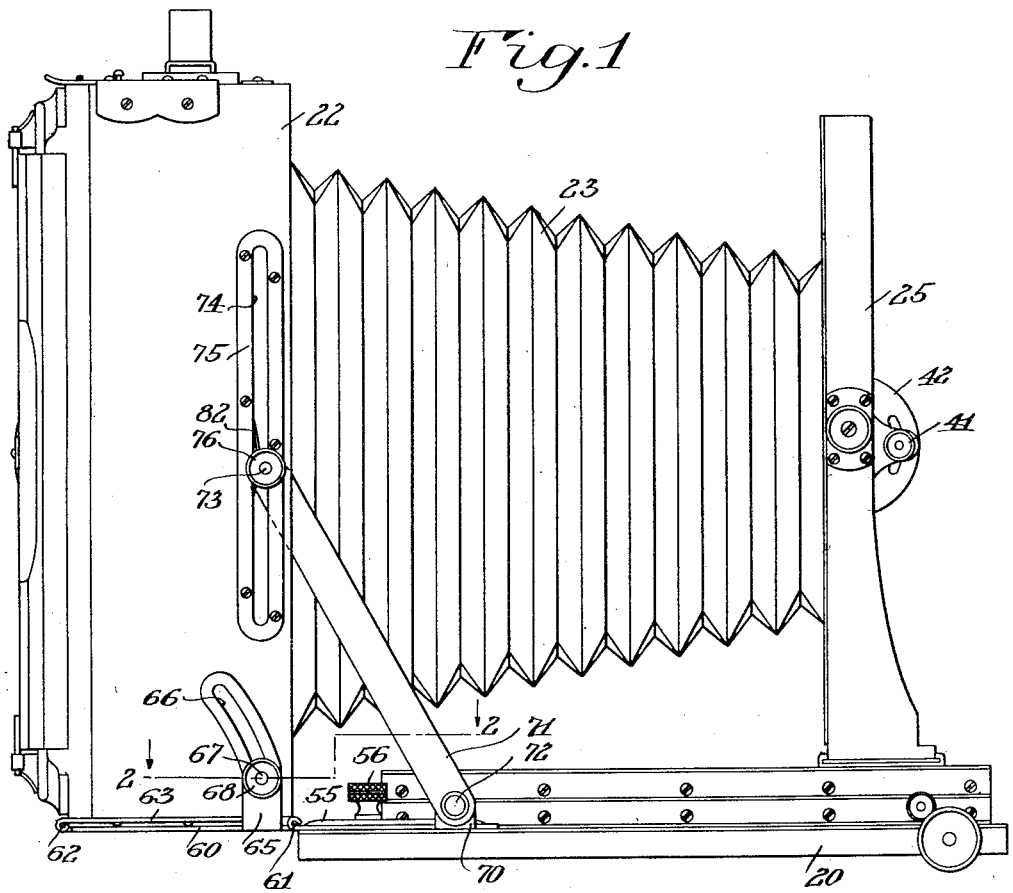
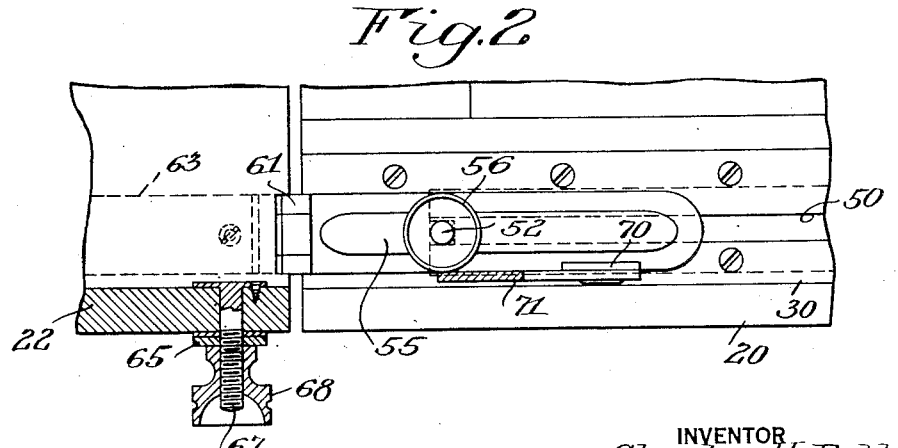
INVENTOR
Charles H. Roth
BY
Cumpston & Griffith
his ATTORNEYS

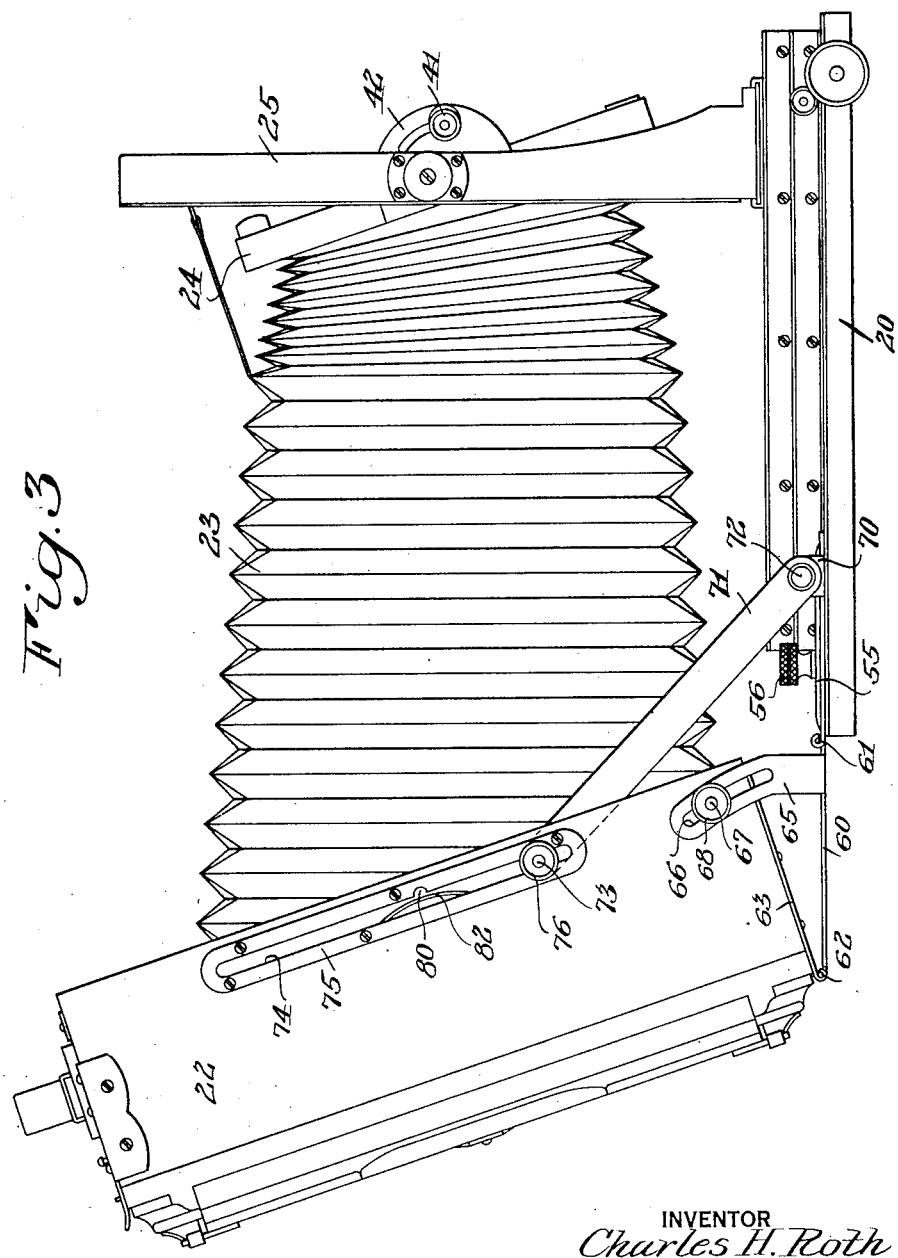

May 5, 1931. C. H. ROTH 1,804,061
CAMERA
Filed Feb. 9, 1929 6 Sheets-Sheet 3
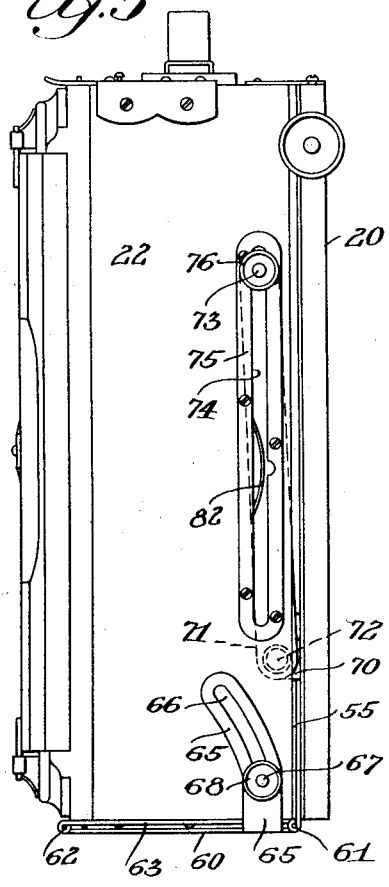
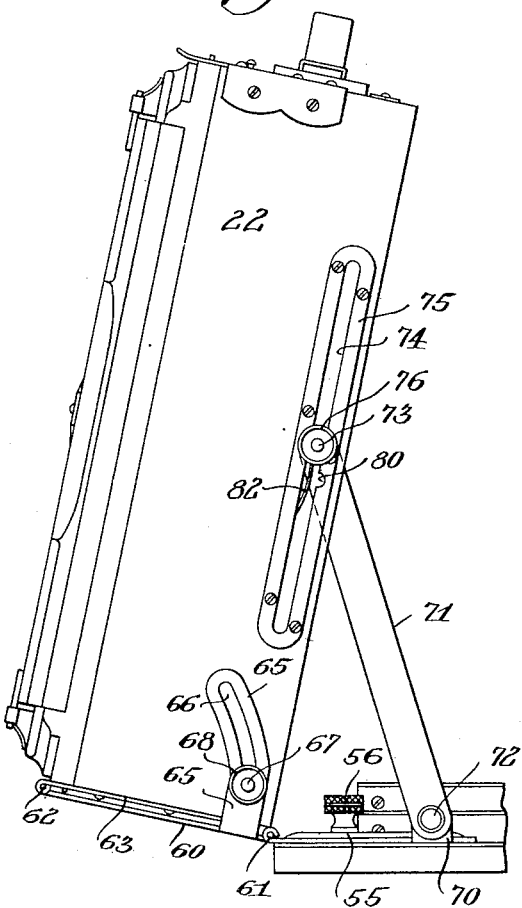
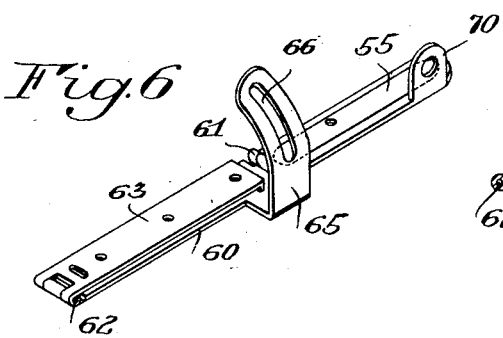
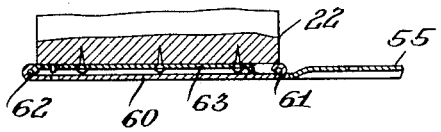
INVENTOR
Charles H. Roth
BY
Cumpston & Griffith
his ATTORNEYS May 5, 1931.  C. H. ROTH  1,804,061
CAMERA
Filed Feb. 9, 1929  6 Sheets-Sheet 4
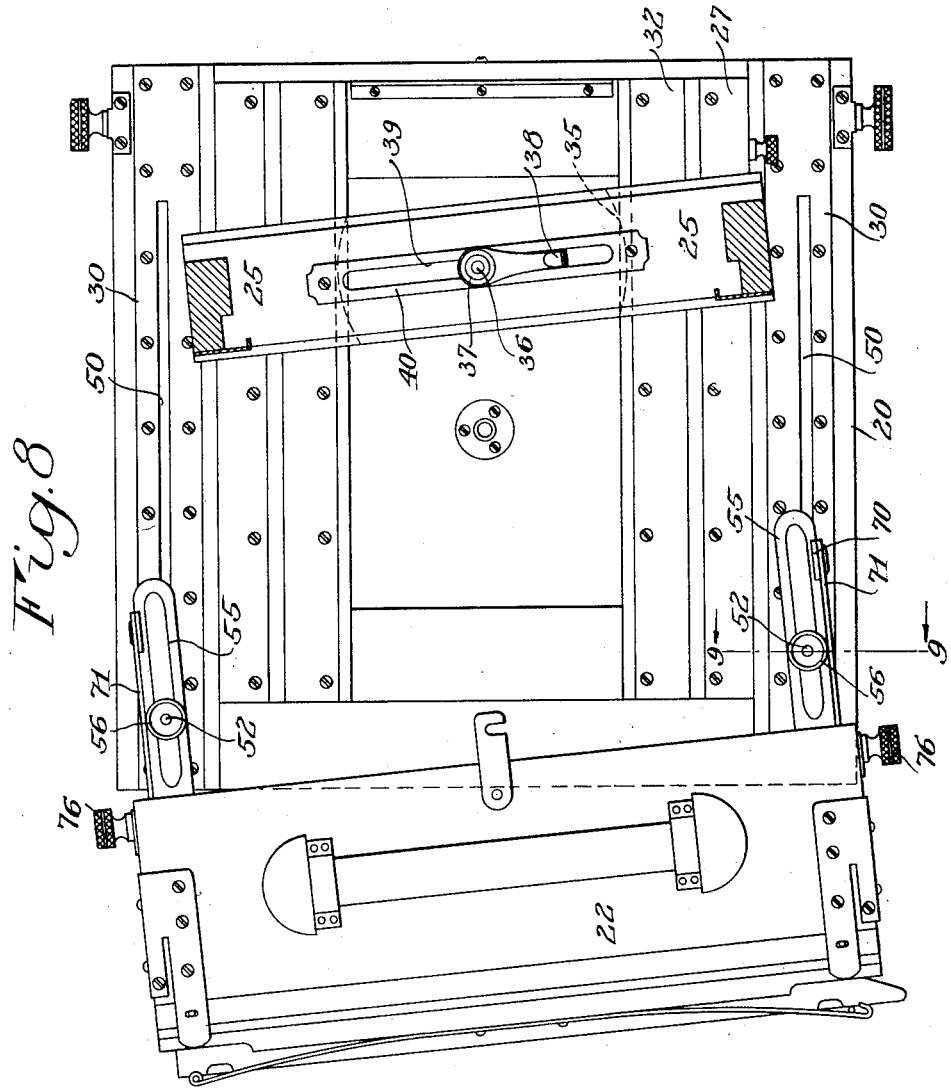
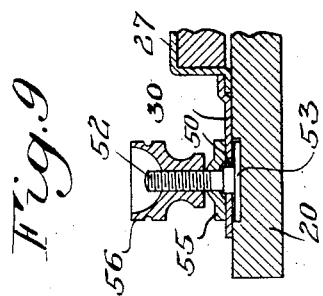
INVENTOR
Charles H. Roth
BY
Cumpston & Griffith
his ATTORNEYS May 5, 1931. C. H. ROTH 1,804,061
CAMERA
Filed Feb. 9, 1929  6 Sheets-Sheet 5

INVENTOR
Charles H. Roth
BY
Crumpton & Griffith
his ATTORNEYS

May 5, 1931. C. H. ROTH 1,804,061
CAMERA
Filed Feb. 9, 1929 6 Sheets-Sheet 6

INVENTOR
Charles H. Roth
BY
his ATTORNEYS

Patented May 5, 1931

1,804,061

UNITED STATES PATENT OFFICE

CHARLES H. ROTH, OF ROCHESTER, NEW YORK, ASSIGNOR TO THE FOLMER GRAFLEX CORPORATION, OF ROCHESTER, NEW YORK, A CORPORATION OF DELAWARE

CAMERA

Application filed February 9, 1929. Serial No. 338,785.

This invention relates to a photographic camera, and has for its object the provision of a camera so arranged and constructed that the camera body may be adjusted to a great variety of different positions relative to the base, for purposes of focusing it properly upon objects in unusual positions or of unusual shapes.

Another object is the provision of a camera the parts of which are connected with each other in such manner that extreme flexibility of movement is possible.

A further object of the invention is the provision of mechanism for clamping or locking a camera body automatically in one selected position relative to the base, this position preferably being the one which is most frequently used, the mechanism being capable of being unlocked or unclamped, however, when it is desired to adjust the camera body to any other position relative to the base.

To these and other ends the invention resides in certain improvements and combinations of parts, all as will be hereinafter more fully described, the novel features being pointed out in the claims at the end of the specification.

In the drawings:

Fig. 1 is a side elevation of a camera constructed in accordance with a preferred embodiment of the invention, showing it in what might be termed its normal or usual open position;

Fig. 2 is a fragmentary view illustrating details of the invention, partly in plan and partly in horizontal section along the line 2—2 of Fig. 1;

Fig. 3 is a view similar to Fig. 1 illustrating the parts of the camera adjusted to a different position, the camera body being tilted backwardly;

Fig. 4 is a fragmentary side elevation showing the camera body tilted forwardly;

Fig. 5 is a side elevation of the camera in closed or folded up position;

Fig. 6 is a perspective view illustrating details of the invention;

Fig. 7 is a fragmentary vertical section illustrating details;

Fig. 8 is a plan of the camera in open position, with parts omitted and parts in horizontal section;

Fig. 9 is an enlarged vertical section taken substantially on the line 9—9 of Fig. 8;

Similar reference numerals throughout the several views indicate the same parts.

Figure 12:
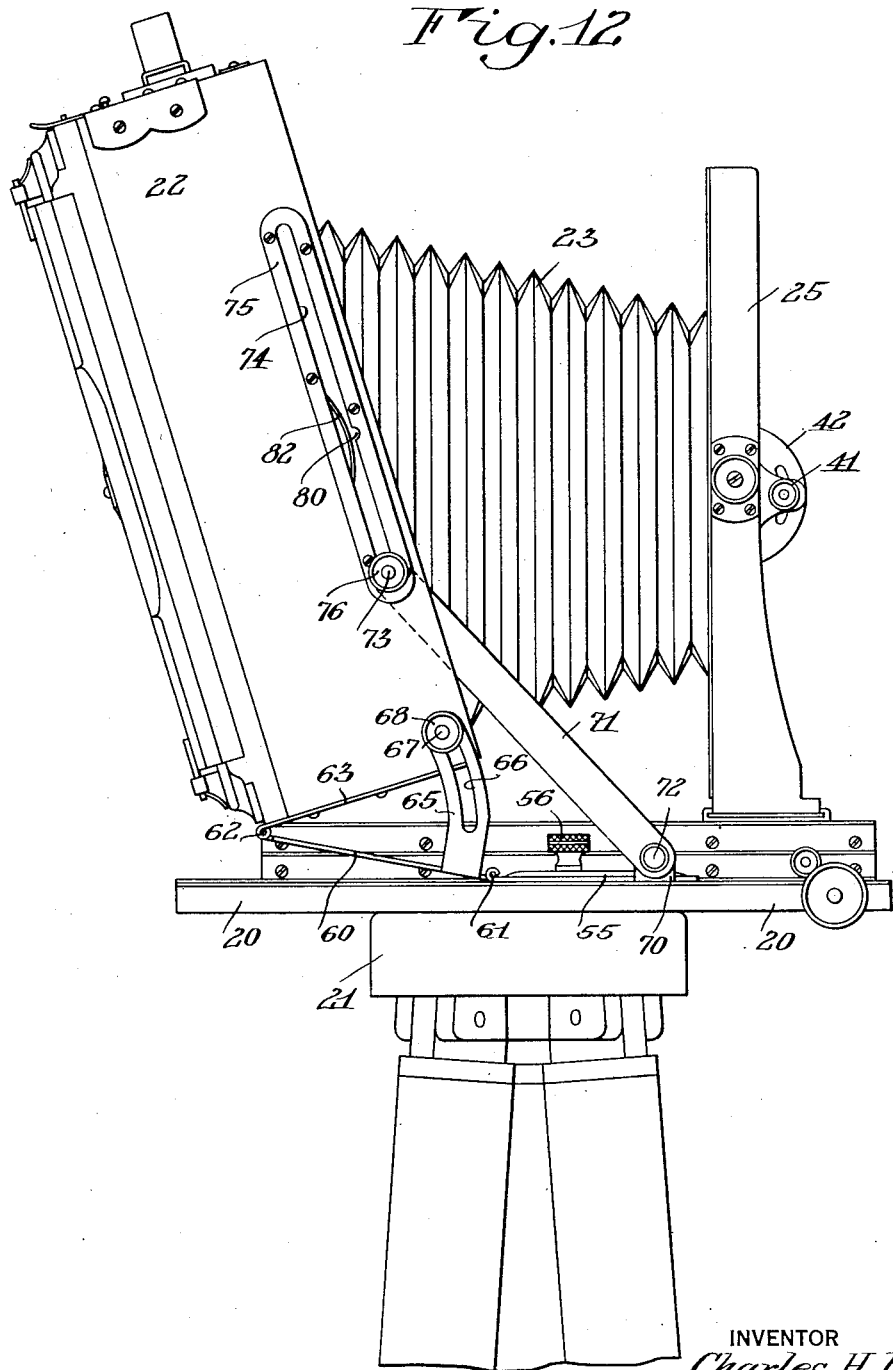
Fig. 12 is a side elevation somewhat similar to Figs. 1 and 3, illustrating the camera adjusted to another position.

Although the invention is capable of use in connection with cameras of a wide variety of types or kinds, it is here described by way of example in connection with a folding camera having a base 20 arranged to be attached to the head 21 of a tripod, as shown in Fig. 12, and having a body element indicated generally by the numeral 22. This body element may be provided with suitable means for holding photographic plate or film, which means forms no part of the present invention, and need not be described here.

Figure 10:
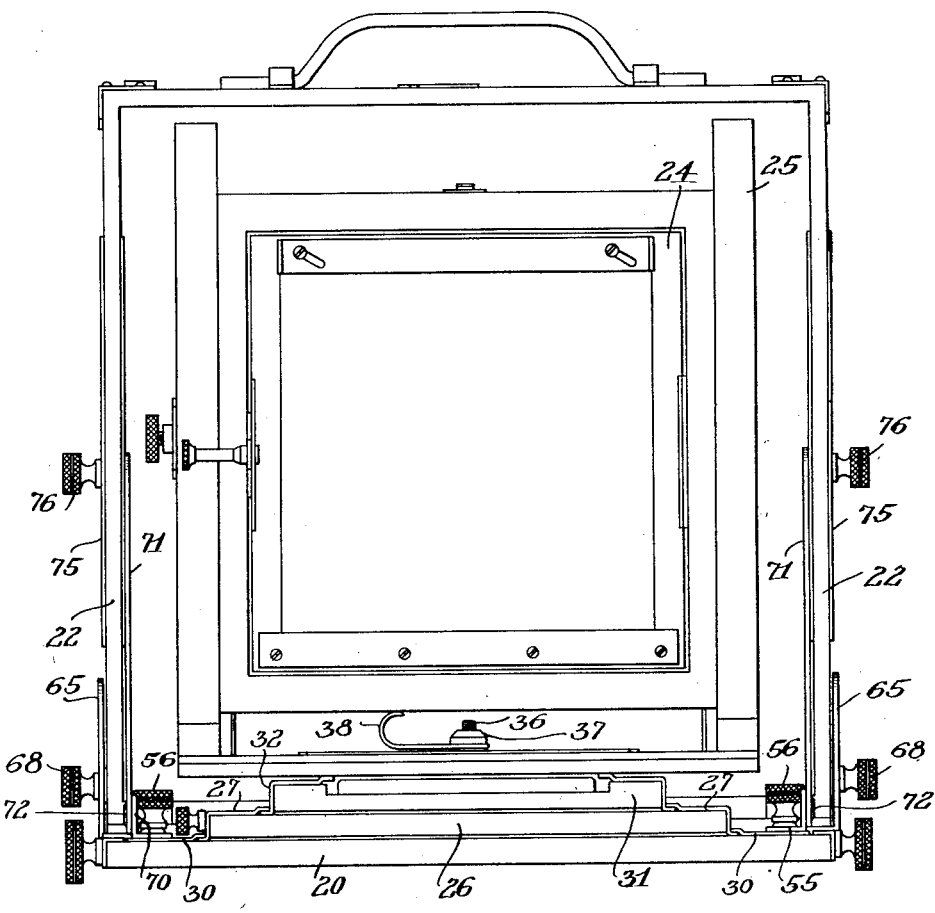
Fig. 10 is a front elevation of the camera.

A camera bellows 23 of the usual type connects the body element 22 to a swinging front 24 (Figs. 3 and 10) suitably pivoted on a front frame 25 which is movably mounted upon the camera base. As one possible arrangement for mounting the front frame on the base, there is shown especially in Figs. 10 and 11 a slide member 26 to which are attached angle plates 27 provided with longitudinal horizontal flanges 28 arranged to extend under the offset edges 29 of plates 30 secured to the base 20. Thus the slide member 26 may be moved longitudinally back and forth along the base 21, the cooperating flanges above mentioned forming a track or guideway.

A second slide member 31 is mounted on top of the first slide member in a similar manner, angle plates 32 on this second slide having horizontal flanges 33 which underlie offset portions 34 formed on the plates 27 of the lower slide. Thus the upper slide 31 may move longitudinally on the slide 26. This arrangement permits the slide 26 to be run out some distance beyond the forward end of the base 20, and the slide 31 to be run out beyond the slide 26, so that the camera front may be placed a considerable distance beyond the front edge of the base 20, if this is necessary to procure the proper focus.

The front frame 25 may be movably secured to the upper slide 31 in any suitable manner, such as by means of a plate 35 attached to a threaded stud 36 having a nut 37 cooperating therewith. When the finger piece 38 on the nut is turned, the stud is elevated to raise the plate 35 to clamp it against the under side of the inward projections on the angle plates 32 secured to the upper slide 31. In this manner, the front frame may be clamped in any desired position along the upper slide 31. Also, it may be turned angularly about the stud 36 as a pivot, or may be shifted horizontally from side to side to offcenter it with respect to the base, since the stud 36 passes through a long slot 39 in a plate 40 on the front frame, as shown in Fig. 8.

Suitable clamping screws are provided, of course, for holding the slides 26 and 31 in the positions in which they may be set. A clamping screw 41 (Figs. 1 and 3) mounted on the front frame 25 cooperates with an arcuate slot in a sector plate 42 on the tilting front 24 to hold this tilting front in any desired position of adjustment.

A camera to be maximum usefulness in commercial photography must be capable of being adjusted to a great variety of different positions so that it may be properly focused to make photographs of objects having peculiar shapes or placed in unusual positions. It is sometimes necessary to tilt either the camera body or the camera front or both, or to turn the body or front sideways, in addition, of course, to moving the body and front back and forth relative to each other for focusing of the more usual type. According to the present invention, novel connections are provided between the body and the base so that the body is capable of the necessary great variety of movements. In fact, the connection between the body and the base is of such a flexible character that the body may be said to have a universal movement relative to the base.

Figure 11:
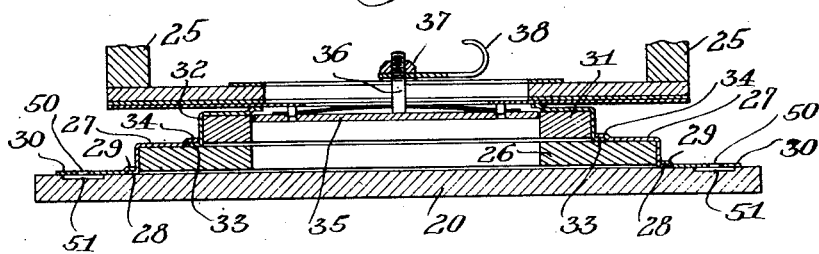
Fig. 11 is a vertical section illustrating the mounting of the camera front upon the base.

The plates 30, above mentioned, which extend along the top of the base 20 adjacent the two side edges thereof, are each provided with a longitudinal slot 50, and a channel 51 is formed in the base 20 under each slot and somewhat wider than the slot, as shown in Figs. 9 and 11. A threaded stud 52 extends through the slot 50 and has a head 53 in the channel 51 so that the stud is capable of movement backwardly and forwardly along the base 20, in the direction of the slot 50.

Mounted on each of these studs 52 is a small plate 55 as shown especially in Figs. 1 and 8, the stud 52 passing upwardly through a hole in the plate and having a knurled nut 56 threaded on it above the plate. When the nut 56 is tightened, the stud 52 will be clamped securely relative to the base 20 and at the same time the plate 55 will be clamped against the top of the base and held securely. When the nut 56 is loosened, however, the stud 52 and plate 55 may be slid back and forth in the direction of the slot 50, and thus the plate may be described as a slidable member. Also, when the nut is loosened, the plate may be oscillated or turned about the stud 52 as an axis.

A pair of connecting members is provided for connecting the plate 55 to the camera body 22, one such connecting member being adjacent each side of the body. Each connecting member comprises a strip or link 60 having a length approximately equal to the length from front to back of the camera body 22, as shown for instance in Fig. 1. The forward end of each connecting member 60 is pivoted or hinged at 61 to the slidable member 55, while the rear end of the connecting member is hinged or pivoted at 62 to a plate 63 secured to the under side of the camera body 22, as shown in Figs. 1 and 7. The plate 63 is so placed relative to the body that the pivot 62 comes substantially at the rear corner of the body while the pivot 61 is substantially at the front corner of the body, as shown. Thus there is provided what might be termed a double hinge connecting the camera body to the base.

A lug or ear 65 is formed on each of the connecting members 60 near the forward end thereof. This lug extends upwardly along the side of the camera body and is provided with an arcuate slot 66 through which passes a threaded stud 67 secured to the body 22 as shown in Fig. 2, and carrying a knurled clamping nut 68. When this nut is tightened, the lug 65 and consequently the connecting member 60 will be held securely in any desired position to which it has been set relative the body 22. By loosening the two nuts 68 (one at each side of the body 22) the connecting member 60 may be shifted to any other position relative to the body 22, or the body may be shifted relative to the connecting member.

Mechanism is also provided for holding or clamping the body 22 in any angular position relative to the base 20 in which it may be desired to place it. This mechanism, as illustrated for example in Figs. 1 and 3, comprises a lug 70 formed near the forward end of each plate 55, and an arm or link 71 pivoted thereto at 72, it being understood that there is one such link 71 at each side of the camera. The upper end of each link 71 extends into the camera body and has a threaded stud 73 projecting outwardly through a slot 74 in an escutcheon plate 75. A knurled clamping nut 76 is threaded on the stud 73, so that when the nut is tightened the upper end of the link 71 is clamped in the position to which it has been adjusted along the slot 74. The stud 73 assumes different positions along the slot, of course, in accordance with different angles at which the camera body 22 may be tilted relative to the base, and this clamping mechanism provides means for holding the camera body in any one of an infinite number of such positions.

Although tilting of the camera body to a non-vertical position is frequently necessary, it is also often desired to place the body vertical or perpendicular to the base 20. The present invention contemplates the provision of means for indicating when the body is perpendicular to the base, and preferably this means takes the form of means for automatically clamping the body in such perpendicular position, the automatic clamping means being releasable at will, of course, so that the body may be shifted to another position if desired.

This automatic clamping means, in its preferred form, comprises a notch 80 at one side of the slot 74 of each escutcheon plate 75, as illustrated for example in Fig. 3, this notch being placed in such position that when the stud 73 is in it, the camera body 22 will be perpendicular to the base 20 as illustrated in Fig. 1. The notch 80 does not appear in Fig. 1, however, since it is hidden from view by the nut 76. Resilient means such as the spring 82 forces the stud 73 yieldably into the notch 80 whenever the stud moves along the slot 74 to this notch.

Thus, when the camera is being set up, the parts may be moved until the studs 73 catch in the notches 80, and the operator will then know that the body is perpendicular to the base as shown in Fig. 1. A great deal of time is saved by having this mechanism for clamping the parts automatically in the position in which they are very frequently used, and the great difficulty of determining by eye when the body is exactly perpendicular to the base is obviated. When this perpendicular setting is not desired, however, it is but the work of an instant to force the stud 73 out of the notches 80 against the tension of the springs 82 by exerting a rearward pressure on the links 71, and the body may then be shifted to any other angular position.

It is sometimes desirable to bring the camera body forward to a position on top of the slides 26 and 31 which support the camera front, and to tilt the body forwardly or backwardly when placed in such position. Such a setting of the camera is illustrated in Fig. 12, from which it will be seen that the novel double hinged connection between the body and the base permits placing the body on top of the slide 31 without the slightest difficulty, and also allows it to be tilted backwardly or forwardly when so placed.

In any of the positions to which the camera body may be tilted, and irrespective of whether it be at the rear end of the base 20 as in Fig. 1 or placed on top of the slide 31 as in Fig. 12, it is possible by loosening the clamping nuts 56 to swing the body horizontally to a limited extent, so that it may be placed somewhat diagonally with respect to the base, as illustrated for example in Fig. 8. Thus the body has practically a universal movement relative to the base, and great flexibilty of operation is secured.

The entire camera may be folded up into a compact form as illustrated in Fig. 5. Supposing the parts to be, for example, in the position shown in Fig. 1, the finger piece 38 is first turned to loosen the camera front from the guideways of the upper slide 31, and the camera front is thrust rearwardly to a position within the body 22, the bellows 23 being telescoped. The clamping nuts 76 are then loosened, the studs 73 are snapped out of the notches 80, and the base 20 is folded upwardly to form the front wall of the camera body, pivoting about the pivots 61 during such movement. The camera then assumes the position shown in Fig. 5, and may be unfolded for use by a reverse process.

While one embodiment of the invention has been disclosed, it is to be understood that the inventive idea may be carried out in a number of ways. This application is, therefore, not to be limited to the precise details shown, but is intended to cover all variations and modifications thereof falling within the spirit of the invention or the scope of the appended claims.

I claim as my invention:

1. A camera comprising a base element, a body element, a connecting member, a pivotal connection between said base element and one end of said connecting member, a second pivotal connection between said body element and the other end of said connecting member, a lug on said connecting member, and clamping means for holding said lug in predetermined relationship to said body element to clamp said connecting member relative to said body element.

2. A camera comprising a base element, a body element, a connecting member, a member slidably mounted on said base element, a pivotal connection between said slidable member and said connecting member, and a second pivotal connection between said body element and said connecting member.

3. A camera comprising a base element, a body element, a member slidably mounted on said base element and arranged for pivotal movement relative thereto about a substantially vertical axis, a connecting member, a pivotal connection having a substantially horizontal axis between said slidable member and said connecting member, and a second pivotal connection having a substantially horizontal axis between said body element and said connecting member.

4. A camera comprising a base element having one portion higher than another portion thereof, a body element, a connecting member, a pivotal connection between said base element and said connecting member, and a second pivotal connection between said body element and said connecting member, said second pivotal connection being spaced from the first pivotal connection so that said body element may be moved vertically to rest either upon the lower portion or upon the higher portion of said base element.

5. A camera comprising a base element, a body element, a connecting member, a pivotal connection between said base element and said connecting member, a second pivotal connection between said body element and said connecting member, clamping means for holding said connecting member in predetermined relationship to said body element, and clamping mechanism for holding said body element in desired relationship to said base element.

6. A camera comprising a base element, a body element, a pivotal connection between said base element and said body element so that the latter may be tilted to a plurality of different positions relative to the former, mechanism for holding said body element in any one of said positions relative to said base element, and resilient means for automatically locking said mechanism in position for holding said body element in a selected one of said positions, said locking means being releasable at will so that said body element may be shifted to any other desired position.

7. A camera comprising a base element having one portion higher than another portion thereof, a body element, a member mounted to slide horizontally on said base element and capable of oscillation relative to said base element about a substantially vertical axis, a connecting member, a pivotal connection between said slidable member and said connecting member, a second pivotal connection between said body element and said connecting member, said second pivotal connection being spaced from the first pivotal connection so that said body element may rest either upon the higher portion or upon the lower portion of said base element and may be tilted at either position, and a link connection between said slidable member and said body element for holding said body element in desired position relative to said base element.

8. In a camera, the combination with a base and body, of a connecting element between the two comprising a three part hinge embodying an intermediate leaf, an end leaf secured to the body and an opposite end leaf secured to the base element.

9. In a camera, the combination with a base and body, of a connecting element between the two comprising a three part hinge embodying an intermediate leaf, an end leaf secured to the body and an opposite end leaf slidable on the body element and provided with a clamping means for adjustment thereon.

10. In a camera, the combination with a base and body, of a connecting element between the two comprising a three part hinge embodying an intermediate leaf, an end leaf secured to the body and an opposite end leaf secured to the base element, an extension on the intermediate leaf, and clamping means on the body cooperating therewith to hold the latter at different angular positions of adjustment.

11. In a camera, the combination with a base embodying a superposed extension, of a connecting element between the two comprising a three part hinge embodying an intermediate leaf, an end leaf secured to the body and an opposite end leaf slidable on the body element and provided with a clamping means for adjustment thereon, the body element being adapted to be swung forwardly to rest upon the superposed extension of the base.

CHARLES H. ROTH.